3,101,999
LOW TEMPERATURE DEFLUORINATION OF PHOSPHATE MATERIAL

Thomas J. Malley and Harry F. Cosway, Stamford, and Sydney A. Giddings, Darien, Conn., assignors to American Cyanamid Company, New York, N.Y., a corporation of Maine
No Drawing. Filed Jan. 13, 1961, Ser. No. 82,383
3 Claims. (Cl. 23—108)

This invention relates to the preparation of solid phosphates useful as animal feed supplements. More particularly, it relates to the defluorination of triple superphosphate by controlled temperature calcination. Still more specifically, the invention is concerned with the defluorination of triple superphosphate by controlled temperature calcination followed by an alkaline earth metal fusion of the so-calcined products to obtain phosphates nutritionally valuable as animal feed supplements.

Attempts have heretofore been made to produce nutritionally valuable animal feed supplements from superphosphates or triple superphosphates by various techniques. Unfortunately, none is entirely commercially satisfactory. For instance, triple superphosphate has been subjected to heat treatment to remove its fluorine content. Calcining temperatures in excess of 1700° F., usually in the range of 2000° F. to 3000° F., are employed to reduce the aforementioned fluorine content to approximately one-half percent or below. Unfortunately, the use of elevated temperatures, i.e., temperatures above 1700° F., has the major drawback that it requires large fuel consumption and results in the evolution of copious quantities of noxious sulfur dioxide gas. The latter is discharged directly into the atmosphere. This practice is undesirable because the atmosphere becomes polluted. The chemical absorption of sulfur dioxide gas on the large scale is an expensive and troublesome operation. To obviate this and other drawbacks, attempts have been made to defluorinate a superphosphate involving, for example, a sulfuric acid leach followed by the removal of the solids so-formed and the heat treatment of the residual solution. The leaching step appears to produce removable and undesirable impurities which interfere with the subsequent heat-treating operation; however, this leach step entails an additional operation which renders the over-all process economically unfeasible. The desirability for providing an over-all economical process for the manufacture of nutritionally valuable phosphates is well established. If such a process can be developed, it would be highly desirable.

It is, therefore, a principal object of the present invention to provide defluorinated, dehydrated phosphates capable of ready conversion to satisfactory sources of phosphorus for animal nutrition. It is a further object to provide defluorinated, mixed, dehydrated phosphates prepared by calcination at temperatures substantially below 1700° F. It is still a further object to economically prepare solid phosphates in nutritionally available form. Other objects and advantages will become apparent from a consideration of the following detailed description.

To this end, triple superphosphate containing of from about 1% to 3% fluorine is subjected to heat treatment at temperatures within the range of from about 1050° F. to about 1300° F. Unexpectedly, the fluorine content is reduced substantially within this controlled temperature range. The so-calcined, defluorinated phosphate mixture can next undergo fusion by heat treatment with an alkaline material, such as alkali metal carbonate or an alkaline earth oxide, to form phosphates useful as nutritionally valuable animal feed supplements.

According to the process of the present invention, triple superphosphate as prepared, for instance, by intimately contacting phosphate rock and wet process phosphoric acid and curing the mixture for approximately forty days, is calcined at temperatures between about 1050° F. and about 1300° F. Usually, ten minutes and not more than about one hour are sufficient to cause substantial defluorination to occur. Thus, the fluorine content is almost quantitatively reduced.

In general, calcination is preferably carried out in a rotary kiln calciner, whereby the surface of the triple superphosphate is exposed for the ready removal of fluorine and occluded water. Resultant products, obtained from calcining crude triple superphosphate, are believed to be mixed, water-insoluble, dehydrated phosphates. The latter can then be fused with an alkaline material, such as either an alkaline earth oxide or a mixture of alkaline earth oxide and an alkali metal carbonate, to obtain principally either tricalcium orthophosphate or dicalcium monosodium orthophosphate.

It is advantageous that the defluorination operation of the present invention can be carried out at relatively "low temperatures," usually between 1050° F. and 1300° F. A preferred operating temperature for effecting the initial calcination is one between 1100° F. and 1200° F. However, to facilitate the defluorination operation by preventing sticking or agglomeration of the triple superphosphate, calcination may also be carried out in the presence of from 1% to 5% added clay, talc or diatomaceous earth. Further modifications are also contemplated. For instance, maintaining a water vapor atmosphere in the presence of added clay or diatomaceous earth is also desirable to increase the rate of fluorine evolution. Mixed water-insoluble dehydrated phosphates containing a mol ratio of phosphorus to fluorine of 100 to 1 or better are obtained.

Resultant mixed, dehydrated, water-insoluble phosphates so obtained contain, as far as is known, a mixture of dicalcium pyrophosphate, calcium acid pyrophosphate, calcium metaphosphate and polymeric calcium phosphates in a variety of crystalline forms. Further, the fluorine content therein is about 0.26 percent or lower, being reduced from approximately 2.5 percent fluorine and the phosphorus content expressed as $P_2O_5$ is increased from 47% $P_2O_5$ of the original charge to about 60% $P_2O_5$ in the final calcined product. However, the defluorinated, mixed, dehydrated phosphates cannot be immediately employed as an animal feed supplement, for the reason that they are not nutritionally available to the animal. Accordingly, the calcined products must be further processed to convert them into a more useful and desirable form.

Advantageously, the calcined phosphate mixture can be further processed by subjecting such admixture to fusion with alkaline materials. Fusion occurs at temperatures between 1800° F. and 2000° F. within from five to sixty minutes. Tribasic orthophosphates are readily recovered in yields of 90 percent or better.

Illustrative alkaline treating materials are: alkali metal carbonates, such as sodium carbonate, potassium carbonate and alkaline earth carbonates or oxides, such as calcium carbonate or calcium oxide, as well as mixtures thereof such as sodium carbonate and calcium oxide, preferably present in equimolar amounts.

The invention will be illustrated in conjunction with the following examples which are to be taken as illustrative only and not by way of limitation. All parts are by weight, unless otherwise noted.

*Example 1*

Triple superphosphate (previously prepared by: admixing 1.6 parts of 54% $P_2O_5$ wet process phosphoric acid with one part of finely ground phosphate rock [80% of which passes through a 200 mesh Tyler screen and containing about 34% $P_2O_5$] and allowing it to cure for forty days) is a friable product, which on analysis contains approximately 47% $P_2O_5$ and a high fluorine content, namely about 2.2% fluorine in the form of metal fluorides, silicon fluorides and hydrogen fluoride. The latter triple superphosphate is added in finely divided form to a rotary kiln to which 5% diatomaceous earth is added. The kiln contents are heated to a temperature between about 1050° F. and 1100° F. for about thirty minutes. The so-calcined product is next removed from the rotary kiln. On analysis it is found to contain about 59% $P_2O_5$ and about 0.25% fluorine.

Four parts of the so-calcined product are admixed and ground with one part of calcium oxide and heated in a direct fired kiln to a temperature of 1800° F. for about 15 minutes. The calcined material, which is a mixed, dehydrated calcium phosphate, is converted into essentially tricalcium orthophosphate. In this form, the phosphorus can readily be absorbed nutritionally by animals, such as chickens.

*Example 2*

Five parts of triple superphosphate, as defined in Example 1 above, are admixed with 0.25 part of diatomaceous earth and the mixture is added to a rotary kiln. Water vapor is added continuously to the internal kiln atmosphere. The contents therein are heated to a temperature of 1150° F. and maintained at that temperature for a period of one-half hour. On analysis, the fluorine content of the calcined triple superphosphate is found to be reduced from 2.26% to 0.15%, while simultaneously observing an increase in the $P_2O_5$ content from 47% to 59%.

Four parts of the so-calcined product are admixed and ground with one part of calcium oxide and heated in a direct fired kiln to a temperature of 1800° F. for about 15 minutes. The calcined material which is a mixed, dehydrated calcium phosphate, is converted into essentially tricalcium orthophosphate. In this form, the phosphorus can be readily absorbed nutritionally by animals, such as chickens.

*Example 3*

The procedure of Example 2 is repeated in every detail except that calcium oxide is replaced by a mixture consisting of 0.5 part of calcium oxide and 0.75 part of sodium carbonate per part of calcium oxide used therein. X-ray diffraction analysis shows the product to consist principally of tribasic calcium sodium orthophosphate and tricalcium orthophosphate.

*Example 4*

Repeating Example 1 in every detail except that the initial calcining temperature is 1300° F. Similar fluorine content reduction is thereby obtained.

We claim:
1. In an improved process for preparing phosphatic animal feed supplement of high nutritional availability the improvement which comprises: heat treating triple superphosphate containing more than 1% fluorine at a temperature between about 1050° F. and 1300° F. for a time sufficient to effect the reduction of the fluorine content of said triple superphosphate to less than about 0.26%, calcining the latter defluorinated triple superphosphate product at a temperature of from about 1800° F. to about 2000° F. in the presence of an alkaline material selected from the group consisting of alkali metal carbonates, alkaline earth carbonates, alkaline earth oxides and mixtures thereof, for from about five to sixty minutes, and thereafter recovering nutritionally available animal feed phosphates of low fluorine content.

2. The process according to claim 1, in which the alkaline earth oxide is calcium oxide.

3. The process according to claim 1, in which the alkaline earth compound and alkali metal carbonate mixture consists of calcium oxide and sodium carbonate, respectively.

References Cited in the file of this patent

UNITED STATES PATENTS

| | | |
|---|---|---|
| 1,880,491 | Rothe et al. | Oct. 4, 1932 |
| 2,234,511 | Wight et al. | Mar. 11, 1941 |
| 2,442,969 | Butt | June 8, 1948 |
| 2,562,718 | Hollingsworth | July 31, 1951 |